United States Patent [19]

Clerk

[11] Patent Number: 4,522,349
[45] Date of Patent: Jun. 11, 1985

[54] HAND-HELD FISHING REEL

[76] Inventor: Ernest J. Clerk, 18 South Av. Rest Pen, Kingston 10, Jamaica

[21] Appl. No.: 525,466

[22] Filed: Aug. 22, 1983

[30] Foreign Application Priority Data

Sep. 2, 1982 [GB] United Kingdom ............... 8225043

[51] Int. Cl.³ .......................................... B65H 75/40
[52] U.S. Cl. ........................................ 242/96; 242/99
[58] Field of Search .............. 242/96, 99, 84.8, 84.2 J; 254/134.3 FT

[56] References Cited

U.S. PATENT DOCUMENTS

| | | | |
|---|---|---|---|
| 2,689,709 | 9/1954 | Waldschmidt | 242/96 X |
| 2,712,908 | 7/1955 | Kozminski | 242/99 |
| 3,006,574 | 10/1961 | Hardy | 242/96 |
| 3,090,577 | 5/1963 | Lewandowski | 242/99 X |
| 3,215,359 | 11/1965 | Sanders | 242/211 X |
| 3,289,968 | 12/1966 | Wilson | 242/96 |
| 3,388,876 | 6/1968 | Wilson | 242/96 |
| 3,557,483 | 1/1971 | Wilson | 43/20 |
| 3,687,393 | 8/1972 | Wilson | 242/96 |

FOREIGN PATENT DOCUMENTS

| | | | |
|---|---|---|---|
| 2435133 | 2/1976 | Fed. Rep. of Germany | 242/96 |
| 382102 | 11/1964 | Switzerland | 242/96 |
| 798141 | 7/1958 | United Kingdom | 242/96 |

Primary Examiner—Stuart S. Levy
Assistant Examiner—Joseph J. Hail, III
Attorney, Agent, or Firm—Thomas P. Mahoney

[57] ABSTRACT

A fishing reel is provided with a housing having a central opening therein. An annular spool is rotatably mounted on roller bearings around the outside and a fishing line is wound around the spool. The spool is rotated by a gear wheel engaging teeth around the inside of the spool to pay out or bring in the fishing line. The gear wheel is driven by a crank handle. Brake pads are urgeable manually or with the aid of levers, against the side wall of the spool to reduce or stop the rotation of the spool.

5 Claims, 4 Drawing Figures

HAND-HELD FISHING REEL

BACKGROUND OF THE INVENTION

The present invention relates to a hand-held fishing reel, particularly for fishing from a moving boat, but also capable of being used for other types of fishing.

At present, when fishing from a moving boat, a line is unwound from a reel or frame and trailed behind the boat. When a fish is caught, two hands are used to pull in the line and as the catch is pulled in, the line gathers loosely in the bottom of the boat. Not only is there a danger of a coiled line entangling a fisherman's hands and fingers as a fish is pulled toward the boat, but also as the line is pulled into the boat it forms knots and kinks which have to be unravelled before the line is cast out again. Alternatively, when a fish is caught, the line can be rewound onto the fishing frame, but this is very slow and impractical especially when a large fish is caught.

OBJECTS AND SUMMARY OF THE INVENTION

The object of the present invention is to provide a hand-held fishing reel that overcomes the above-mentioned disadvantages.

According to the present invention, there is provided a hand-held fishing reel comprising a housing having an opening therein suitable for inserting a hand to hold the housing, an annular spool rotatably mounted with respect to the housing and having a central opening therein that is always in register with the opening in the housing, gear teeth arranged around the circumference of the central opening, a gear wheel rotatably mounted with respect to the housing that meshes with the teeth of the spool and means for rotating the gear wheel.

The spool is annular in shape and the inner surface thereof is supported on roller or any other suitable form of bearings within the housing.

In operation, a fishing line is coiled around the spool and when it is desired to commence fishing, the reel is held in one hand by way of the opening in the housing and a line, with a hook and bait on one end, is paid out. In order to prevent more line being pulled off the reel than is desired, the reel preferably includes a brake comprising one or more brake pads operable on the spool to slow down or stop any motion between the housing and the spool. Preferably two or more brake pads are provided that together are urgable against opposing portions of the two end faces of the spool. Preferably the brake is so located that it is operable by the hand holding the fishing reel.

The braking effect can be increased if each brake pad is urged against the spool by means of a manually operable lever. In the case in which there are at least two levers urging respective brake pads against the spool, the levers are advantageously operated by a single brake activating mechanism, e.g. a further lever, that operates all the brake-pad urging levers simultaneously.

Preferably, the arrangement is such that the brake can be activated by the hand that is holding the housing.

The relative sizes of the spool, the gear wheel and the means for rotating the gear wheel, which is preferably a crank handle, are preferably such that reduction gearing is provided, that is to say that the mechanical advantage of the gearing system is greater than 1, so that, in the event of catching a large fish, the force needed to land it is less than the pull exerted by the fish.

Two forms of reel in accordance with the present invention will now be described, by way of example only, with reference to the accompanying drawings.

Other objects and advantages of the invention will be apparent from the following specification and the accompanying drawings, which are for the purpose of illustration only.

DESCRIPTION OF THE BEST EMBODIMENTS CONTEMPLATED

Figure 1:
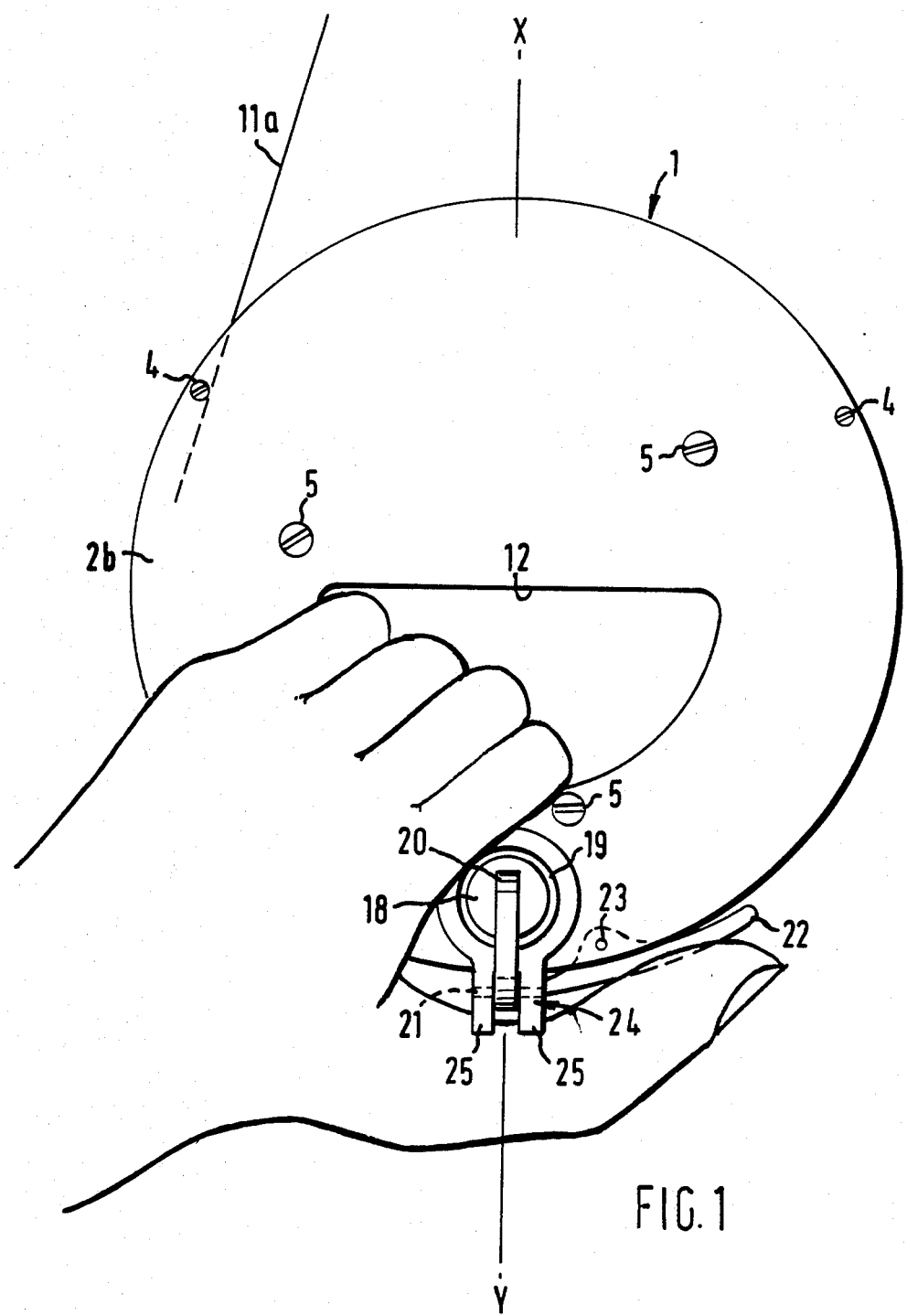
FIG. 1 is a side elevational view of the first form of reel.
Figure 2:
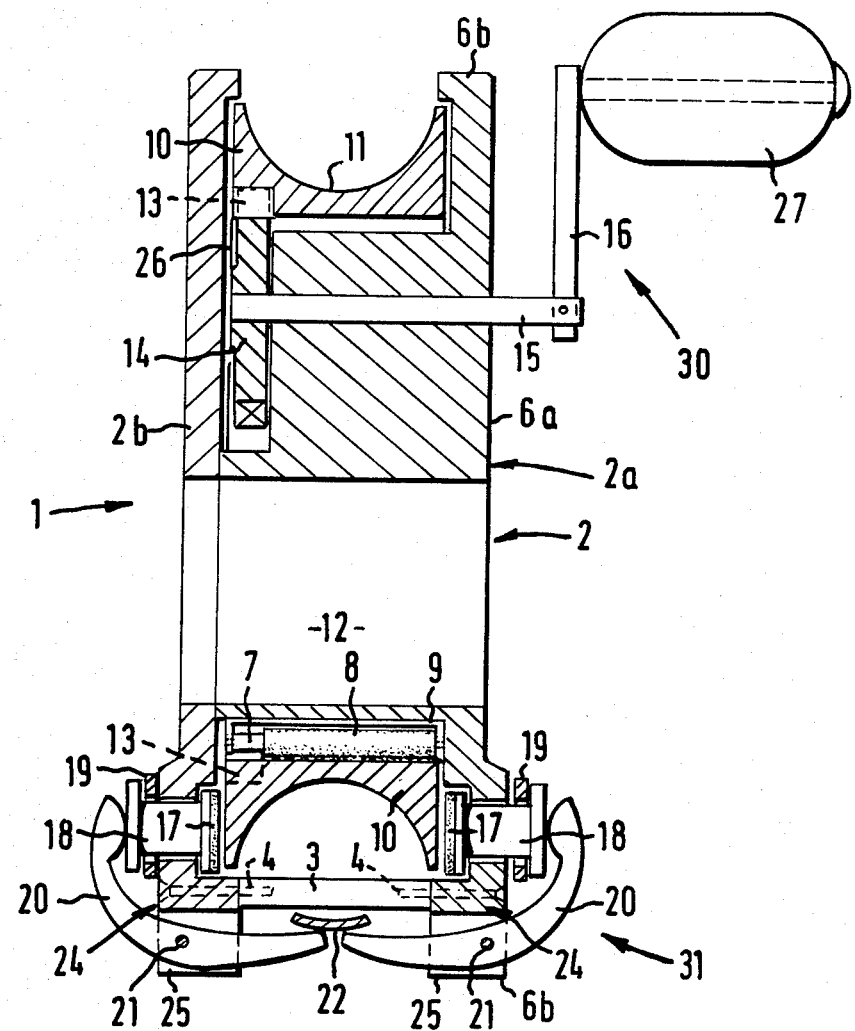
FIG. 2 is a cross-sectional view along the lines X—Y of FIG. 1.
Figure 4:
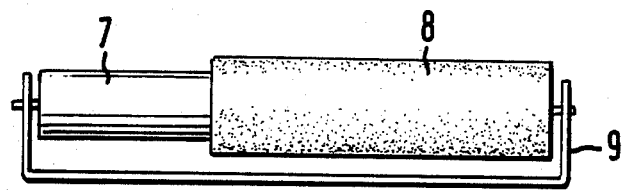
FIG. 4 is a side elevation of a part of the reels shown in FIGS. 2 and 3.

Referring to FIGS. 1 and 2, there is shown a fishing reel 1 having a generally circular housing 2, a spool 10, a gear mechanism 30 and a braking unit 31. The housing consists of two parts 2a and 2b held together by spacer bars 3 (only one shown) and associated screws 4 located around the periphery of the housing and also by screws 5 (shown only in FIG. 1) that extend through the housing part 2b into 2a. The housing part 2a is composed of a central portion 6a and an annular flange portion 6b. Three equally spaced recesses are formed in the periphery of the central housing portion 6a and in each of the recesses there is located a stepped roller bearing 7 consisting of a roller 8 and a cage 9 shown in greater detail in FIG. 4.

Resting on the roller bearings 7 is an annular spool 10 that, by virtue of the roller bearings 7, is freely rotatable with respect to the housing 1. The spool 10 has a grooved outer surface 11 around which fishing line 11a (FIG. 1) is wound.

The housing 2 is provided with an opening 12 through which the fisherman's hand can be inserted and by this means the reel housing can be gripped as shown in FIG. 1. Because the spool rotates on roller bearings 7 on the periphery of the annular central housing portion 6a and not on a central axle, the rotation of the spool 10 in no way interferes with the opening 12.

The spool 10 has teeth 13 extending all the way around one side of the inner surface thereof. The stepped portion of the rollers 8 of the roller bearing 7 underlies the teeth 13 and so makes no contact with the teeth. The gear mechanism 30 consists of a gear wheel 14 fitting in recess 26 in the central housing portion 6a. The gear wheel 14 is connected by a shaft 15 extending through the housing part 6a to a crank handle 16 with a knob 27. The gear wheel 14 meshes with the teeth 13 of spool 10, and by turning the handle 16, the spool 10 can be caused to turn inside the housing 2 to wind in or pay out fishing line. The arrangement as shown provides reduction gearing, i.e. the force needed to turn the handle 16 is less than that exerted on the fishing line by a fish caught on the line.

The brake unit 31 consists of a pair of pins 18 on which are mounted brake pads 17. The brake pads 17 are biased out of engagement with the spool 10 by resilient washers or springs 19 acting on the pins 18. The outer surface of each pin 18 is contacted by a lever 20 that is pivoted to the housing 2 at 21. The inner portions of the levers are in turn contacted by a rocker arm 22

(see FIG. 1) that is pivoted to the housing at 23. Each lever is pivoted to the housing 2 at 21 between two arms 25 of brackets 24 forming extensions to the periphery of housing parts 2a and 2b (see FIG. 1). Pins 18 extend through the housing parts 2a and 2b and the brake pads 17 mounted on the pins 18 are located to engage opposing portions of the side walls of the spool 10 to slow down or stop any movement between the spool and the housing 2. When it is desired to apply the brake, the rocker arm 22 is depressed in the manner shown in FIG. 1, the rocker arm is thereby urged against the inner portions of the levers 20, causing them to move the pins 18 inwardly against the action of washers 19 toward the spool 10 and causing the brake pads 17 to bear against the side face of the spool, thereby applying a braking action.

Figure 3:
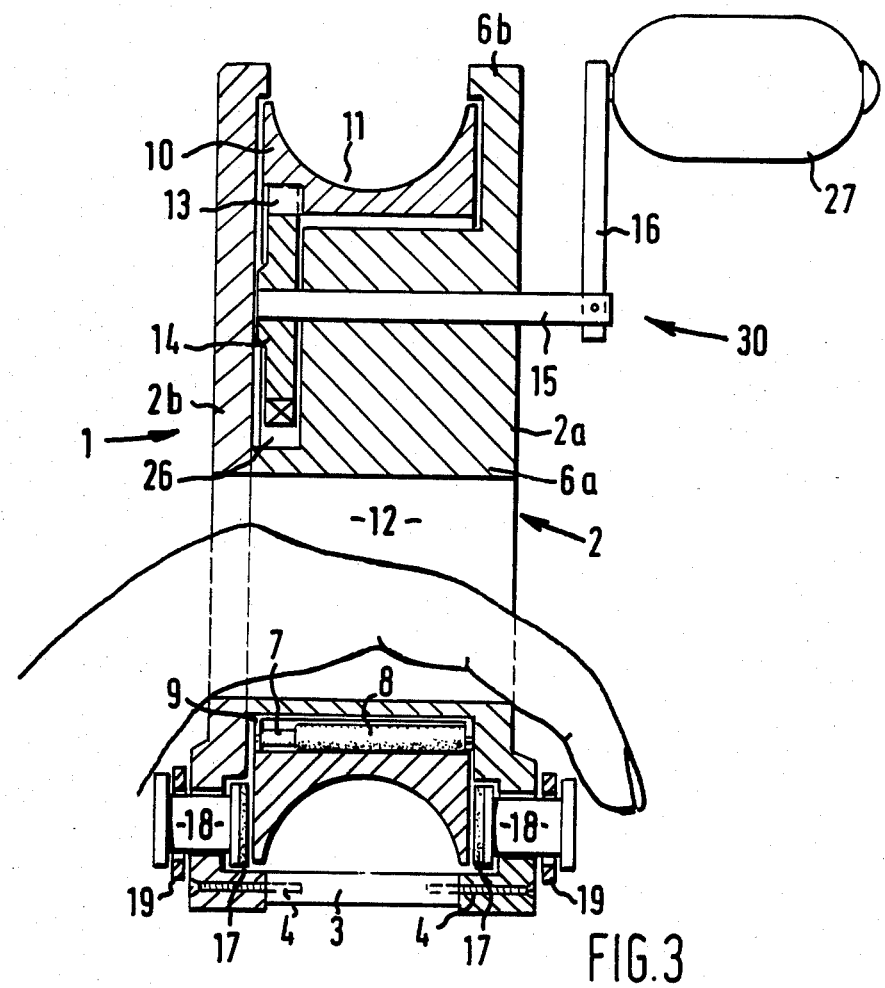
FIG. 3 is a cross-sectional elevational view of the second form of reel.

The form of reel shown in FIG. 3 is essentially the same as that shown in FIGS. 1 and 2 with the exception that the brake brackets 24, the braking levers 20 and the rocker arm 22 are omitted; the brake is applied by pressing pins 18 with the finger tips and the palm of the hand in the manner shown in FIG. 3.

When it is desired to start fishing, the reel is held in one hand, e.g. the left hand, by inserting that hand through the opening 12 in the housing and grasping the housing as shown in FIG. 1. Line 11a wound on the spool 10, with a hook and bait (either natural or artificial) at one end, is pulled off the spool by the free hand (the right hand) and paid out over the side of a moving boat. The drag effect of the water on the hook and bait will pull the line out and cause the spool 10 and the handle 16 to rotate. When sufficient line has been uncoiled, the brake pads 17 are urged against the spool either by pressing the rocker arm 22 in the manner described above (FIGS. 1 and 2) or by pressing the brake pins 18 as described above (FIG. 3). This braking action causes the spool to stop and prevents further line from being pulled out. The line is then allowed to trail in the water behind the boat with a light pressure being applied to the braking system to prevent further line being dragged out. Alternatively, the handle 16 may be held in the free hand (right hand) to achieve the same effect.

When a fish is caught, extra pressure on the brake system will prevent line being pulled out. The handle 16 is then taken in the free hand (right hand), the brake is released (the resilient washer 19 urges the brake pads 17 away from the spool 11) and the handle 16 is turned, which causes the gear wheel 14 to turn the spool 10 thereby rewinding the line onto the spool. Even distribution of the line on the spool can be ensured by moving the reel from side to side as the line is rewound. Spacer bars 3 prevent the line from flying off the reel and overlapping lips 24 on the housing parts 2a and 2b overlapping the sides of the spool prevent the line from getting between the housing 2 and the spool 10.

The fishing reels shown in FIGS. 1 to 3 have the following substantial advantages:

(i) the reels can be made of inexpensive plastic material, thus the reel as a whole is cheap to manufacture;

(ii) the reduction gearing reduces the effort needed to land a large fish;

(iii) the reel is easily dismantled for servicing or to replace worn parts.

Whereas the present invention has primarily been described in connection with fishing from a moving boat it is possible to use the reel in connection with fishing from a static boat or a pier, etc.

I claim:

1. A hand-held fishing reel comprising: a housing having an opening therein suitable for inserting a hand to hold the housing; an annular spool rotatably mounted with respect to the housing and having a central opening therein bounded by an inner spool surface, the central opening in the spool always being concentric with the opening in the housing; gear teeth arranged around the said inner spool surface; a gear wheel rotatably mounted within the housing that meshes with the said gear teeth; a crank handle located on one side of the housing; and a shaft passing through the said housing and connecting the handle to the gear wheel, wherein the gear wheel engages the said teeth along an edge portion of the inner spool face remote from the handle.

2. A reel as claimed in claim 1 which includes a brake comprising two or more brake pads that are urgeable against opposed sides of the spool to slow down or stop any motion between the spool and the housing.

3. A reel as claimed in claim 2 wherein the brake comprises lever means to urge the brake pads against the spool.

4. A reel as claimed in claim 3 wherein the said two or more brake pads are each urgeable against the spool by a separate lever and wherein the brake further comprises a single brake activating means for operating all the levers simultaneously.

5. A reel as claimed in claim 2 wherein the arrangement is such that the brake is operable by the hand holding the housing.

* * * * *